Figure 1:
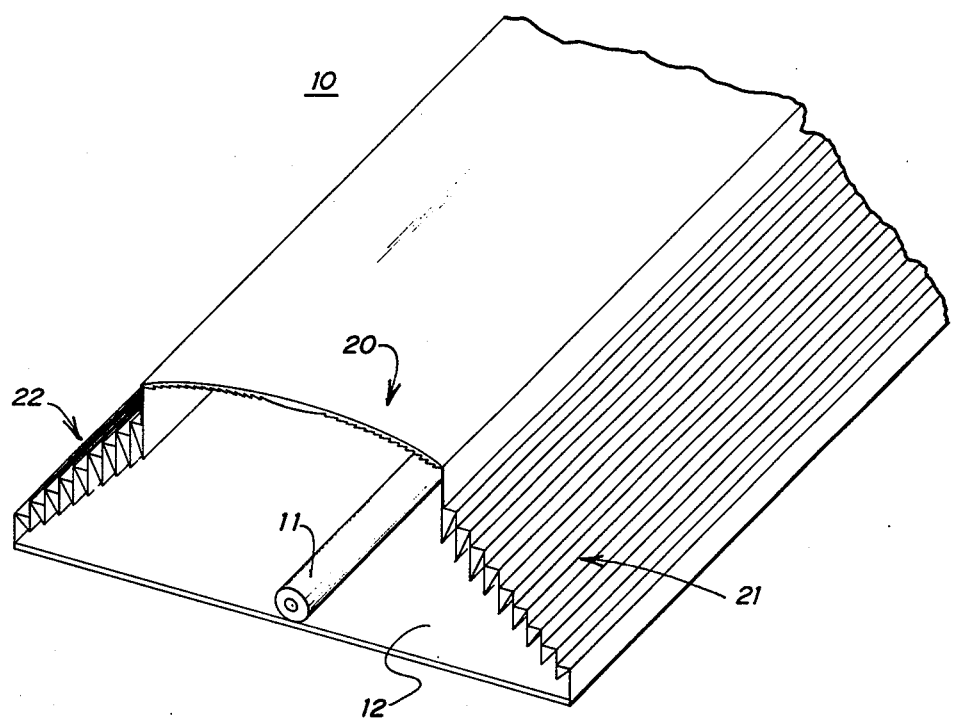

United States Patent

Northrup, Jr.

[11] 4,022,186
[45] May 10, 1977

[54] COMPOUND LENS SOLAR ENERGY SYSTEM

[76] Inventor: Leonard L. Northrup, Jr., 4312 Westway, Dallas, Tex. 75205

[22] Filed: Sept. 10, 1975

[21] Appl. No.: 611,861

[52] U.S. Cl. .............................. 126/271; 126/270; 350/211; 350/299
[51] Int. Cl.² ........................................ F24J 3/02
[58] Field of Search ........... 126/270, 271; 237/1 A; 350/211, 299

[56] References Cited
UNITED STATES PATENTS

| 895,761 | 8/1908 | Huntoon | 126/271 |
| 1,479,923 | 1/1924 | Moreau | 126/270 |
| 2,791,214 | 5/1957 | Poliansky | 126/270 |
| 2,920,710 | 1/1960 | Howard | 126/270 |
| 3,058,394 | 10/1962 | Edlin | 126/270 |
| 3,125,091 | 3/1964 | Sleeper, Jr. | 126/271 |
| 3,915,148 | 10/1975 | Fletcher et al. | 126/271 |

*Primary Examiner*—Kenneth W. Sprague
*Attorney, Agent, or Firm*—Richards, Harris & Medlock

[57] ABSTRACT

A solar collector includes an elongated heat exchange element onto which the sun's rays are to be directed. A compound concentration lens system is mounted to direct the sun's rays onto the heat exchange element and includes a center refractor extending the length of the element for refracting the sun's rays onto the portion of the surface of the heat exchange element facing the sun. A pair of reflectors extend on each side of the refractor, said reflectors each having a plurality of parallel prisms arranged one above the other for reflection of light onto the sides of the heat exchange element.

1 Claim, 2 Drawing Figures

COMPOUND LENS SOLAR ENERGY SYSTEM

This invention relates to solar collectors, and more particularly to a compound elongated collector having a refraction section and a pair of reflecting sections, one on either side of the refracting section.

The collection of solar energy for use in heating assumes greater importance as energy problems of the civilized world become more acute. There have been many different approaches made to the problem of converting solar energy into a form that may be manipulated and controlled on a basis other than direct utilization of the sun's rays.

Efficiency of operation and low fabrication costs are goals which conflict. The present invention is aimed at optimizing both such factors.

In U.S. application Ser. No. 523,220, filed Nov. 13, 1975, for "Solar Energy Collector", now abandoned, a linear Fresnel lens is disclosed serving to refract sun's rays onto a heat exchange tube. As is known, there is a critical angle dependent upon the properties of the media used for the lens, beyond which refraction does not take place. Thus, a plurality of heat exchange units must be employed in order to convert sun's rays impinging a given area to the energy in a manipulatable and useful form.

The present invention is directed to a system in which a compound lens is employed utilizing both reflection and refraction for concentrating sun's rays onto a given heat exchange element thus reducing substantially the number of such elements necessary to receive sun's rays from a given area.

In accordance with the invention, an elongated heat exchange element is provided onto which the sun's rays are to be directed. A compound lens system is mounted to direct sun's rays onto the element and is formed of a center refractor section extending the length of the element to refract the sun's rays onto the surface of the element facing the sun with a pair of reflectors extending the length of the element, one on each side of the refractor with the reflectors having a plurality of parallel prisms arranged one above the other for refraction of light onto the sides of the element.

Figure 2:
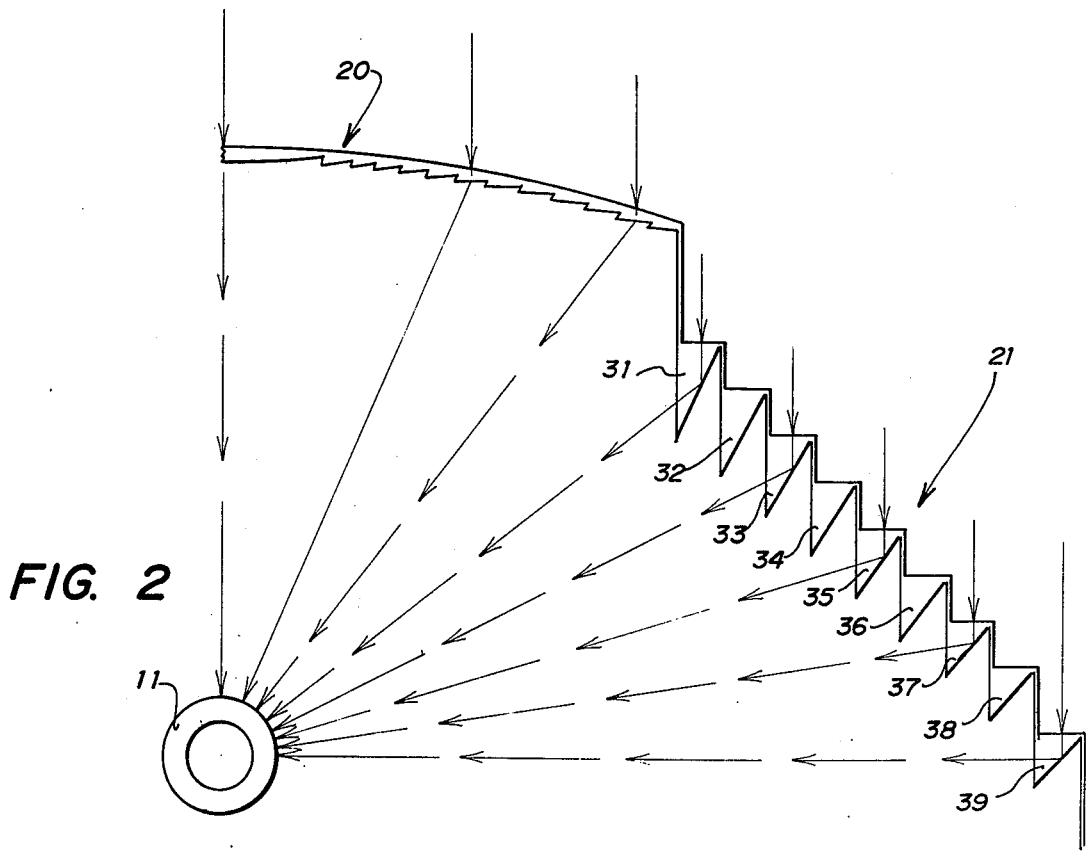

The novel features believed characteristic of the invention are set forth in the appended claims. The invention itself, however, as well as further objects and advantages thereof, will best be understood by reference to the following detailed description of an illustrative embodiment taken in conjunction with the accompanying drawings, in which:

FIG. 1 is an isometric view illustrating the principle of the present invention; and FIG. 2 is a sectional view of an embodiment of the invention.

Referring now to FIG. 1, a compound lens 10 has been illustrated which serves the purpose of concentrating or directing light rays from the sun onto a heat exchange element 11. The heat exchange element 11 is mounted on a base plate 12 which also supports the lens. Plate 12 extends the length of element 11 and has end panels (not shown). A heat exchange fluid is to be directed through a heat exchange element 11 so that energy from the sun's rays converted to heat in the element 11 will be carried away to a utilization system.

The lens 10 comprises a refracting section 20 and a pair of reflecting sections 21 and 22. The refracting section preferably will be of the Fresnel type having a plurality of internal refracting prisms constructed in accordance with the above-identified application Ser. No. 532,220, now abandoned. The Fresnel lens serving as a refractor 20 operates efficiently to direct the sun's rays impinging section 20 onto the surface of the heat exchange unit 11 which faces the sun. In cooperaion therewith, the reflecting sections 21 and 22 serve to reflect the sun's rays onto the sides of the heat exchange unit 11.

More particularly, as shown in FIG. 2, the side section 21 comprises a series of reflecting prisms 31–40. Preferably, the prisms are formed as an integral elongated extrusion, integral with the section 20. The prism 40 is a right angle prism so that there is total reflection of incident light onto the side of the heat exchange unit 11. The prisms 31–39 are arranged in a stepped relation above the unit 40 so that light is reflected from the inner faces thereof onto element 11. Thus, the angles of the prisms 31–40 in the embodiment shown in FIG. 2 differ in an ordered progression.

From FIG. 2, it will be seen that the system provides for collection of energy from the sun in a single collector from an area more than twice the area accommodated utilizing the refraction section 20 only. Thus, for a given lens-collector length, i.e., focal length, the compound lens can be at least twice as wide as otherwise possible. Where the refraction section 20 becomes inefficient, the reflection sections 21 and 22 become efficient and thus complement the refractor section 20.

As illustrated in FIG. 2, the refracting and reflecting sections are formed as a single extrusion. The refracting lenses are preferably undercut for assuring utilization of the sun's energy impinging the entire area of the refracting section 20. The reflecting prisms in section 21 are shaped so that sun's rays impinging perpendicular the outer faces of the lenses will be directed onto the sides of the heat exchange unit 11. Thus, in accordance with the present invention, a solar collector comprises an elongated heat exchange element 11 onto which the sun's rays are to be directed. A compound concentration lens system is mounted to direct the sun's rays onto element 11. The compound lens is formed of a center refractor 20 extending the length of the element 11 with a pair of reflector sections extending the length of the element, one on each side of the refractor with the reflectors each having a plurality of parallel prisms arranged one above the other for reflection of light onto the sides of element 11.

Having described the invention in connection with certain specific embodiments thereof, it is to be understood that further modifications may now suggest themselves to those skilled in the art and it is intended to cover such modifications as fall within the scope of the appended claims.

What is claimed is:

1. A solar collector comprising:
   an elongated heat exchange element onto which the sun's rays are to be directed,
   a compound concentration lens system mounted to direct sun's rays onto said element and formed of a center refractor extending the length of said element to refract sun's rays onto the surface of said element facing the sun, and
   a pair of reflectors extending the length of said element, one on each side of said refractor, said reflectors each having a plurality of parallel prisms arranged one above the other for reflection of light onto the sides of said element.

* * * * *